Oct. 16, 1934.  A. J. KNAPP  1,977,312
CONVEYER
Filed Jan. 15, 1930   2 Sheets-Sheet 1
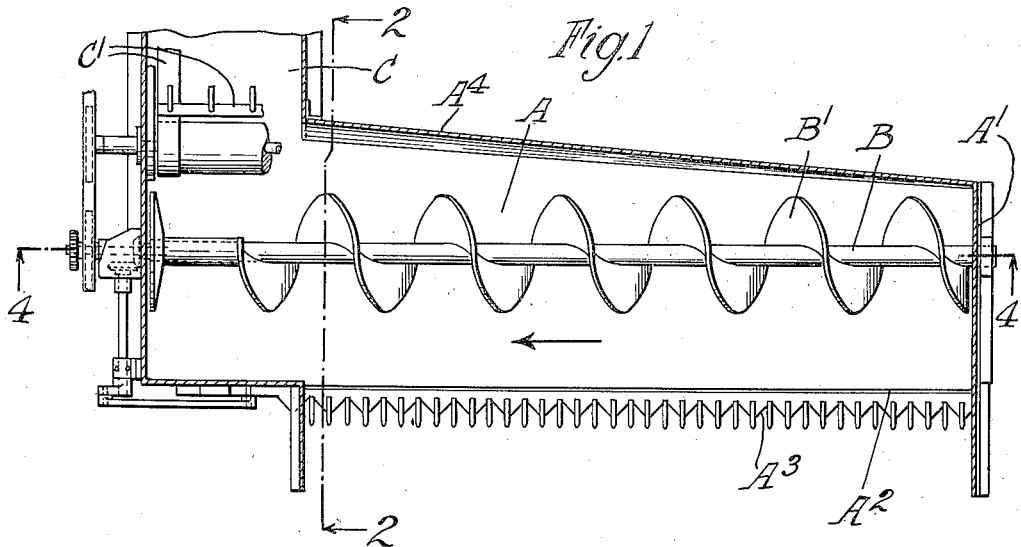
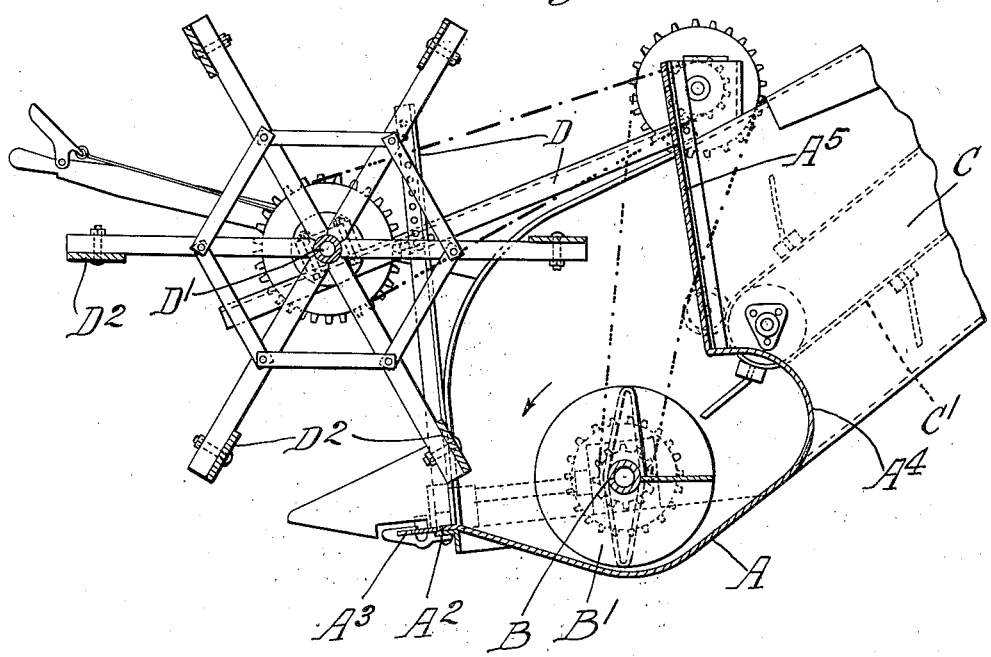
Inventor
Amadee J. Knapp
by Parker & Carter
Attorneys Oct. 16, 1934.　　　A. J. KNAPP　　　1,977,312
CONVEYER
Filed Jan. 15, 1930　　2 Sheets-Sheet 2

Inventor
Amadee J. Knapp
by Parker & Carter
Attorneys.

Patented Oct. 16, 1934

1,977,312

UNITED STATES PATENT OFFICE 1,977,312

CONVEYER

Amadee J. Knapp, Laporte, Ind., assignor, by mesne assignments, to Allis-Chalmers Manufacturing Company, a corporation of Delaware Application January 15, 1930, Serial No. 420,833

20 Claims. (Cl. 198—213)

This invention relates to a conveyer and in the form illustrated herewith it is particularly adapted for use as a conveyer in connection with a grain cutting or handling equipment. It may, for example, be used in a harvester or in a combine in which harvesting and grain separating equipment are combined in a single machine, which may be moved as a whole across the fields to harvest and separate grain as it moves. The device, however, is not limited to this association or use.

One object is to provide a grain conveying means which will prevent jamming when it is used and which will accommodate the varying or increased amount of grain from one end to the other.

Other objects will appear, from time to time, in the course of the specification and claims.

The invention is illustrated more or less diagrammatically in the accompanying drawings, wherein:

Fig. 1 is a horizontal section taken on a plane approximately parallel to that of the axis of rotation of the conveying member;

Fig. 2 is a transverse vertical cross section taken on line 2—2 of Fig. 1;

Like parts are designated by like characters throughout the specification and drawings.

A is an open sided apron or housing, carried by and strengthened with suitable frame members. It is provided with an end portion $A^1$ which may extend slightly forward of its front edge $A^2$ along which a sickle bar $A^3$ is provided. The rear of the apron A is flared or bulged rearwardly away from the auger, as indicated at $A^4$. This flare increases from the outer end toward the inner end of the auger, the flare being its greatest adjacent the machine to which the conveyer is attached, and being its least at the outer end of the auger. The apron may continue above the portion $A^4$ and be forwardly inclined as at $A^5$ to extend somewhat over the auger. The portion of the apron or housing at the lower side of the auger is preferably disposed at substantially the same distance from the auger throughout its length, and hence providing substantially the same clearance throughout the length of the auger at this portion of the housing, as generally indicated in Figs. 1, 3 and 4.

Figure 3:
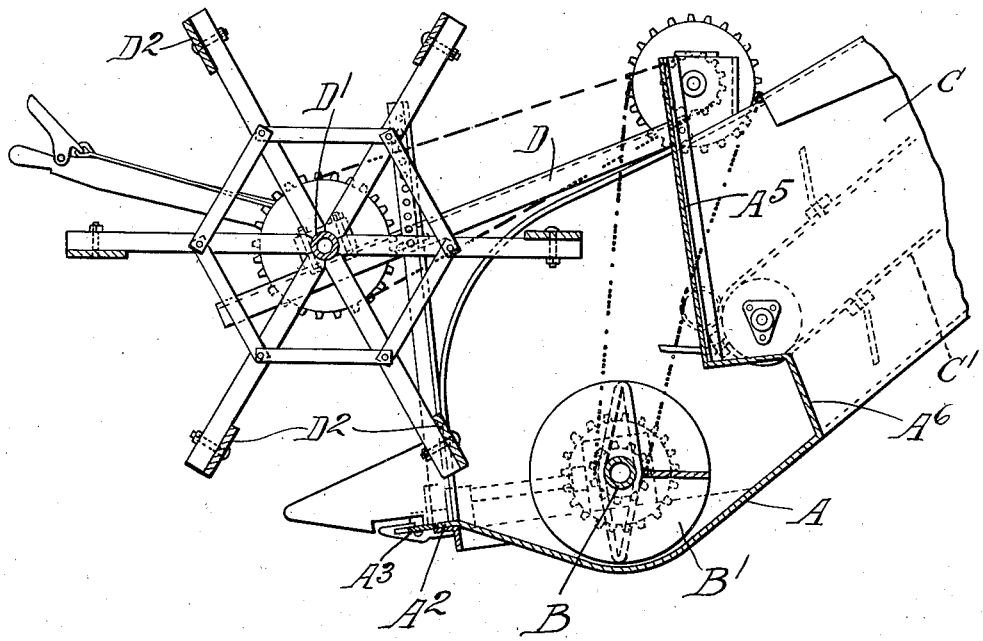
Fig. 3 is a view generally similar to Fig. 2 and showing a modified form of the apron.
Figure 4:
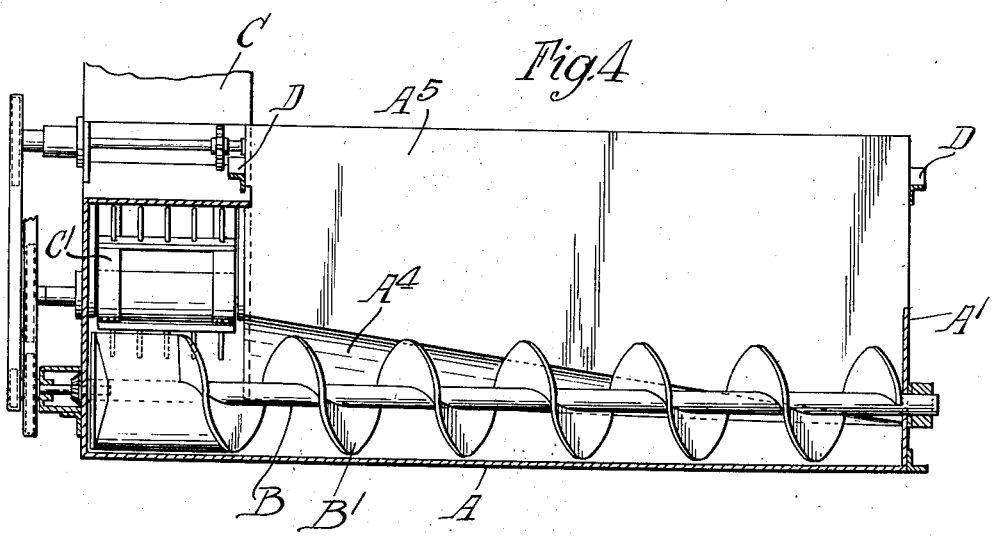
Fig. 4 is a view in vertical cross section in the plane of the line 4—4 of Fig. 1, but with the rotatable conveying member shown in elevation.

The construction shown in Fig. 3 is the same as that shown in Fig. 2, except for the shape or contour given to the flared rear portion of the apron A. Instead of being generally curved as shown in Fig. 2 at $A^4$, it is given an angular cross section as shown in Fig. 3 at $A^6$.

B is a shaft supported in suitable bearings, the details of which form no particular part of the present invention. The shaft carries an auger or screw conveyer $B^1$ by means of which the material which is engaged by the auger is moved laterally in the direction of the arrow as shown in Fig. 1, within the housing C. Within this housing is a conveyer diagrammatically indicated at $C^1$, by means of which the grain or other material moved within the housing by the auger is conveyed to whatever points it may be desired. It may be conveyed to a loading mechanism or to a separating mechanism, in case the device is associated with a combine.

There may also be positioned in front of the sickle bar a beater. D, D are supports for a beater shaft $D^1$ which carries beating elements $D^2$. The beater, sickle bar, auger and conveyer $C^1$ are all driven by suitable driving connections from any available power source.

It will be realized that whereas I have described and shown an operative device, nevertheless many changes might be made in the size, shape, number and disposition of parts without departing from the spirit of my invention.

The use and operation of my invention are as follows:

The conveying auger assembly may be used in any place where it lends itself to effective use, either as a means alone or as a means associated with other mechanisms. In the form illustrated, the auger conveyer is particularly adapted for association with a grain collecting and conveying assembly of a combine thresher by means of which grain may be cut in the field, conveyed to the threshing zone and threshed and separated and grain discharged from the machine or stored in the tank in the machine for subsequent discharge, and the chaff and straw and other refuse discharged from the machine in any suitable manner and at any suitable point.

As shown in Fig. 1, the auger is associated with the sickle bar and beater, and all of these parts are so positioned that as the machine is drawn or pushed or in any way moved to the grain, the grain will be brought in contact with the sickle bar and be cut and will fall or be forced toward the auger. The auger is rotated so that material coming in contact with it is moved from the right to the left in the direction of the arrow as shown in Fig. 1. Under normal conditions, a substantially equal amount of material will be cut off by the sickle bar from end to end, but the material which is picked up by the auger at the right hand end, as shown in Fig. 1, is, of course, moved laterally to the left and there is thus a constantly increasing quantity of grain or other material to be moved from the right to the left. The greatest quantity will naturally be at the left of the auger because all of the material picked up anywhere to the right of that point will be moved to the left. To prevent congestion and jamming and to permit the ready handling of this quantity of material, the apron which more or less surrounds the auger is given in part a generally flared or conical cross section. This flare starts at the right hand end as shown in Fig. 1, and is relatively small. It increases or flares steadily to the left and the greatest diameter of the apron is thus adjacent the left hand end of the auger and at the point at which the auger discharges onto the conveyer $C^1$. Thus as the burden of material carried by the auger increases, the space within which the auger is positioned is increased. The heaviest burden is, of course, at the point where the auger discharges onto the conveyer $C^1$ and it is at that point that the greatest space about the auger is provided.

The operation of the modified form shown in Fig. 3 is generally the same as that shown in the other figures. The flared portion is given an angular cross section rather than a curved cross section. For some purposes, and when acting on certain classes of material, this is an advantage. It tends to prevent winding of the material about the auger and it tends to prevent rotation of the entire mass because the material, should it start to rotate with the auger instead of moving along the auger, will contact the angular part of the apron and will thus be held against rotation.

The angular relation and the position of the portions of the housing in the form shown in Fig. 3 might be infinitely varied and such variations would fall within the scope of my invention irrespective of the shape and relation of the several parts of the housing. It is sufficient in this form of the invention that the housing be given a cross section which is not curved.

I claim:

1. In a conveying mechanism, a rotary conveyer, provided with members adapted, when it is rotated, to convey material along said conveyer, and an open sided receiving housing enclosing said conveyer, on two sides alone said housing formed with a radius progressively increasing.

2. In a conveying assembly a screw conveyer, an open sided housing therefor enclosing the conveyer on two sides alone, said conveyer adapted to receive material, to be conveyed, through the open side of the housing, said housing shaped to provide a progressively increasing clearance for said conveyer toward its point of discharge.

3. In a conveying assembly a screw conveyer, an open sided housing therefor enclosing the conveyer on two sides alone, said conveyer adapted to receive material to be conveyed, through the open side of the housing, said housing shaped to provide a progressively increasing clearance for said conveyer from one end to the other.

4. In a grain collecting and conveying assembly, a rotary conveyer, a housing for said conveyer, said housing formed to provide a clearance along one side of said conveyer which increases toward the discharge end of the conveyer, and a constant clearance along another side of said conveyer.

5. In a grain collecting and conveying assembly, a rotary conveyer, a housing for said conveyer, said housing formed to provide a progressively increasing clearance along one side of said conveyer, said clearance being increased toward the discharge end of the conveyer, and a constant clearance along another side of said conveyer.

6. In a grain conveying assembly, a rotary conveyer, a housing partially enclosing said conveyer, said housing having an inlet opening at one side thereof and being shaped to provide a clearance along its side opposite said inlet opening.

7. In a grain conveying assembly, a rotary conveyer, a housing partially enclosing said conveyer, said housing shaped to provide a progressively increasing clearance along the rear of said conveyer alone, said clearance being increased toward the discharge end of the conveyer.

8. In a grain collecting and conveying assembly, a screw conveyer, a housing partially enclosing said conveyer, said housing formed to provide a progressively increasing clearance at the rear of said screw conveyer alone.

9. In a grain collecting and conveying assembly, a grain receiving housing having an open side, adapted to receive grain, and a screw conveyer positioned for rotation within said housing, said housing formed to provide a progressively increasing clearance for said conveyer in the rear thereof alone.

10. In combination in a collecting and conveying assembly, a screw conveyer of constant diameter, an open housing therefor, enclosing the same at rear and bottom alone, the housing shaped to provide a constant clearance for the screw along its bottom, and to provide a progressively increasing clearance for the screw in its rear.

11. In combination in a collecting and conveying assembly, a screw conveyer of constant diameter, an open housing therefor, enclosing the same at rear and bottom alone, in combination with a grain feed mechanism extending into the open sided housing, the said housing shaped about the rear of the screw to provide an edge lying closer to the screw than does the rearmost portion of the housing.

12. In combination in a collecting and conveying assembly, a screw conveyer of constant diameter, an open housing therefor, enclosing the same at rear and bottom alone, the housing shaped to provide a constant clearance for the screw along its bottom, and to provide a progressively increasing clearance for the screw in its rear, the said housing shaped about the rear of the screw to provide an edge lying closer to the screw than does the rearmost portion of the housing.

13. In a machine of the character described including a conveyer pan having an inlet opening at one side thereof, a screw conveyer rotatably mounted in the pan for conveying grain, and means formed in the wall of the pan opposite said inlet opening and extending substantially coextensive with the conveyer for preventing grain from entangling about the conveyer and providing a furrow through which the grain is propelled.

14. In a grain cutting mechanism including a conveyer pan having an open front wall, a screw conveyer mounted in the pan and rotatable in said pan for conveying grain along the pan, and curved guard means extending throughout the major portion of the length of said screw conveyer, forming a furrow in the wall of the pan opposite said open front wall for guiding the grain as it is being moved by the conveyer and preventing the grain from being carried upwardly of the wall due to its direction of rotation.

15. In a machine of the character described including a conveyer pan having an inlet opening at one side thereof and being provided with a discharge opening, a screw conveyer rotatably mounted in the pan for moving grain toward the discharge opening, and a furrow portion formed in the wall of the pan opposite said inlet opening and extending longitudinally of the screw conveyer for preventing grain from entangling about the conveyer.

16. In a grain cutting mechanism including a conveyer pan having a discharge opening, a screw conveyer in the pan for moving grain toward the discharge opening, and a curved guard member extending longitudinally of the screw conveyer of increasing curvature towards the discharge opening for preventing grain from entangling with the screw conveyer in its movement toward the discharge opening.

17. In a grain cutting mechanism including a screw conveyer, a pan for housing the lower portion of the conveyer and having an inlet opening in its front wall and having a rear wall spaced from the conveyer and a curved portion curved inwardly to a point adjacent the periphery of the conveyer to form a furrow extending longitudinally of the conveyer for trapping and guiding grain moved by the conveyer, and an upper wall portion connecting with the terminal of said curved portion to prevent grain from lodging on said curved portion.

18. In a grain cutting mechanism including a conveyer pan having a discharge opening, a screw conveyer rotatable in the pan for moving grain toward the discharge opening, and a rear wall portion for the pan having a furrow portion extending longitudinally thereof for trapping grain tending to be carried upwardly of said wall by the conveyer, said furrow having increasing capacity toward said discharge opening.

19. In a conveyer for grain and the like, a conveyer housing having inlet and discharge openings, and a screw conveyer in said housing for moving material toward the discharge opening thereof, the wall of said housing being provided with an element extending longitudinally of the screw conveyer and forming with the body portion of the housing wall a clearance space about said screw conveyer which progressively increases in cross sectional area in the direction of discharge through said conveyer.

20. In a conveying device, a conveyer housing having inlet and discharge openings, a screw conveyer rotatable in said housing for moving material fed thereto toward said discharge opening, one wall of said housing providing a progressively increasing clearance about said screw conveyer in the direction of discharge of material through said conveyer and having at one point along its periphery a portion extending toward said conveyer screw for facilitating movement of material longitudinally through said conveyer.

AMADEE J. KNAPP.